Figure 6:
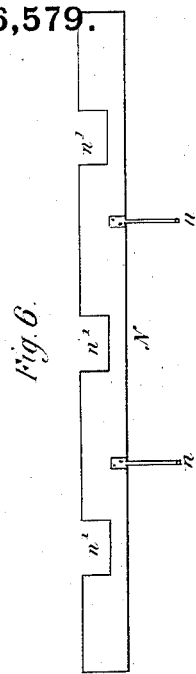

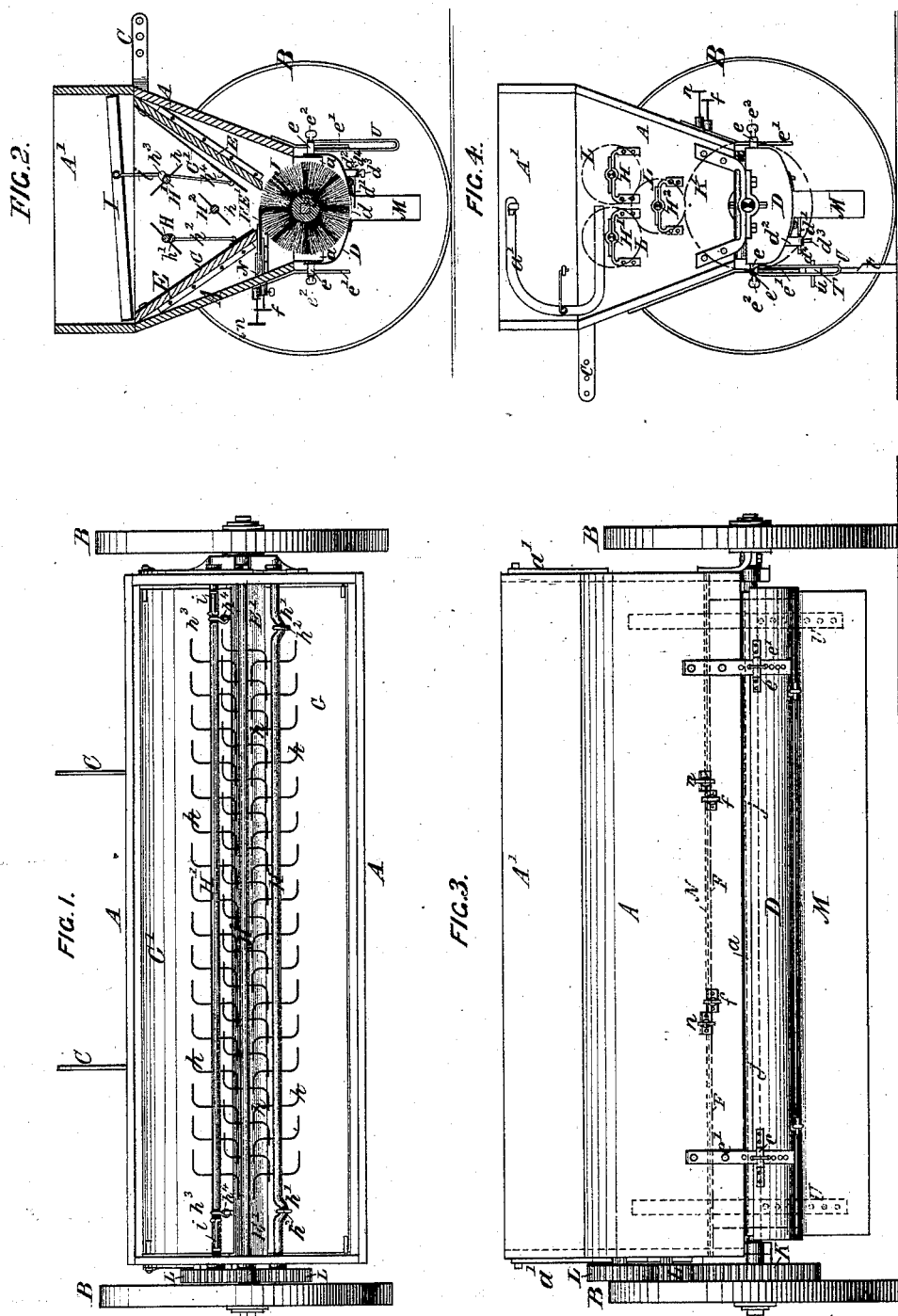

2 Sheets—Sheet 2.

W. SHAW & D. WILLIAMSON.
Machine for Distributing Manure.

No. 216,579. Patented June 17, 1879.

Attest
Walter Allen
Wm N Bates

Inventors:
William Shaw
David Williamson
By Knight Bros attys

N. PETERS, PHOTO-LITHOGRAPHER, WASHINGTON, D. C.

UNITED STATES PATENT OFFICE.

WILLIAM SHAW, OF EDINBURGH, AND DAVID WILLIAMSON, OF WISHAW, COUNTY OF LANARK, NORTH BRITAIN.

IMPROVEMENT IN MACHINES FOR DISTRIBUTING MANURES.

Specification forming part of Letters Patent No. 216,579, dated June 17, 1879; application filed January 29, 1879; patented in England, February 8, 1878.

*To all whom it may concern:*

Be it known that we, WILLIAM SHAW, of the city and county of Edinburgh, and DAVID WILLIAMSON, of Wishaw, in the county of Lanark, North Britain, have invented an Improved Machine for Sowing or Distributing Manures, which is also applicable for sowing seeds or grain, of which the following is a specification.

Our said invention has principally for its object the sowing or distributing of manures over land in a regular, uniform, and economical manner.

The improved machine constituting our said invention may also be used for sowing seed.

The said machine consists of a body open at the bottom and mounted upon wheels, and also provided with means for attaching horses. Along from end to end, underneath the said body, a trough-like cover having a longitudinal aperture in its bottom is fitted so as to be capable of vertical adjustment.

The body of the machine has sloping sides on its interior, constituting a hopper, with a space at bottom between its said sides, and immediately under this space, and extending from side to side of the machine, a revolving circular brush is mounted so that the bristles thereof extend at top close to or through the slot or opening at the bottom of the hopper, and at bottom close to or through the aforesaid aperture or slot in the trough-like bottom cover.

The soot, guano, or other manure to be sowed or distributed is placed in the upper part of the hopper, being received upon a vibrating reticulated tray, through which it descends into the hopper, passing through the slot therein onto the revolving brush, which feeds it through the aperture in the trough-like bottom-cover and onto the land in a regular and uniform manner. As the brush wears the aforesaid trough-like bottom-cover is raised upon the body of the machine, so that the relative positions of the brush and the opening in the said cover are maintained.

The hopper may be provided with stirrers upon shafts passing therethrough, which stirrers will loosen up and distribute the manure equally to the brush, this equal distribution being also promoted by imparting a vibratory motion to the sides of the hopper. Where the trough-like bottom-cover is at some distance above the ground a wind-guard may be fixed around the slot therein, descending to within a short distance of the ground.

Shuttles may be fitted to slide over the opening of the hopper and over that in the trough-like bottom-cover, so as to regulate the quantity of manure passing therethrough.

The machine may be employed for sowing or distributing in drills. For this purpose it is provided with an additional shutter for sliding over the opening at the bottom of the hopper, and a plate is also provided for covering the slot in the trough-like bottom-cover, both the shutter and the plate having cut-away parts or openings therein, which are at a distance apart corresponding to the drills, so as to allow manure or seed to pass only into the drills. Plow-like clearers may also be fixed in front of the machine to clear out the drills for the manure or seed.

Figure 1 of the accompanying drawings represents a plan, Fig. 2 a vertical transverse section, Fig. 3 a back elevation, and Fig. 4 a side elevation, of a machine constructed in accordance with our invention, especially suited to the sowing or distributing of friable manure, such as soot or guano. Figs. 5 to 10 are details hereinafter referred to. In Fig. 4 the near wheel is not shown.

The body of the machine is marked A, the wheels B, and the projections for the attachment of the shafts are marked C. The body A is open at bottom, where it terminates in a vertically-depending metal continuation, $a$, upon which slides the trough-like bottom-cover D. (Shown separately in plan of under side in Fig. 5.) The said cover has a longitudinal slot, $d$, therein, over which slot a shutter, $d^1$, slides in guides $d^2$, for regulating the width of the opening, being fixed in any position to which it may be brought by screws $d^3$ passing into tail-pieces $d^4$ on the said shutter $d^1$.

The cover D is adjustable vertically, being provided with eyes $e\,e$, which slide upon guides $e^1$ $e^1$. Screws $e^2$ $e^2$ pass through these eyes and guides and fix the cover D in any position to which it may be brought.

In the interior of the body of the machine are two inclined side pieces, E E, forming a hopper open at bottom E'. This opening is regulated in width by a shutter, F, provided with handles $f$ $f$, by which it can be adjusted from the exterior of the machine. The said side pieces, E, are covered by flaps G G', hinged at the upper part.

Passing through the machine from side to side thereof are shafts H H¹ H², carrying a number of stirrers, $h$. The shaft H¹ is cranked at $h^3$, and to these cranks are connected rods $h^4$ $i$, the rod $h^4$ being attached at its other end to the side flap, G', and the rod $i$ being attached at its other end to a tray, I, Fig. 2, having a reticulated bottom, and turning upon pivots or centers at one side. This tray I is omitted from Fig. 1.

The upper part of the body of the machine may be a removable box, A', held in place by catches upon brackets $a'$. The shaft H is also cranked at $h^1$, and to these cranks are attached the ends of rods $h^2$, their other ends being connected to the flap G.

The brush J is mounted upon a spindle, $j$, which is held in bearings carried by the short axles of the wheels B, preferably being held so as to be turned by one wheel and to revolve freely in the bearing on the axle of the other wheel, which other wheel has upon its boss a toothed wheel, K, which gears with wheels L upon the shafts H H¹ H², so as to impart a motion of revolution to the said shafts, which, through their cranks $h^1$ $h^3$ and connecting-rods $h^2$ $h^4$ $i$, impart a vibratory or jumping motion to the recticulated tray I and to the side flaps, G G'. Round the opening or slot $d$ in the cover D is fixed a depending chute, M, forming a guard to prevent the substance being sown from being scattered by the wind.

In using the machine, the manure is placed in the receptacle A' upon the tray I, and when the machine is drawn along over the land to be manured, the said tray, by the vibratory motion imparted to it by the rod $i$ from the cranked shaft H¹, shakes down the manure into the hopper beneath, where it is stirred and loosened up by the revolving stirrers $h$; thence it passes through the opening E' onto the brush J, its passage being facilitated and equalized by the vibratory motion imparted to the side flaps, G G', through the arms $h^2$ $h^4$, from the cranks of the shafts H H¹. By the revolution of the brush the manure is carried down and brushed through the slot $d$ in the cover D, and is therefrom distributed equally over the land.

A small circular brush may be used upon the lower shaft, H², in place of the stirrers shown in the drawings. The machine is also provided with attachments for use where the manure is to be sown or distributed in drills. An additional shutter, N, (shown separately in plan in Fig. 6,) is fitted to slide over the opening E' of the hopper. The said shutter is provided with handles $n$ for moving it, and has openings $n'$ in it at a distance apart about equal to the ordinary or general width apart of the drills.

In employing the machine for sowing or distributing in drills, the guard M is replaced by the guard P. (Shown in plan of under side in Fig. 7 and in longitudinal section in Fig. 8.) This guard consists of a plate, $p$, having openings $p^1$ therein corresponding with those in the shutter N. Chutes Q are attached to this plate over the openings therein, constituting wind-guards around each opening.

The end chutes are capable of adjustment nearer to or farther from the center shute, according to the width apart of the drills, the said end chutes being mounted upon plates $q$ sliding in guides $p^2$. They are fixed in the position to which they may be brought by screws $r$, passing through the eyes $r^1$ upon the plates and through strips $r^2$, upon which the said eyes $r^1$ slide.

The length of the chutes is adjustable vertically by their being made in two pieces, sliding one over the other, and when adjusted they are fixed in position by screws $s$, passing through eyes $s^1$ on one part and strips $s^2$ on the other part of the said chutes.

Figure 9:
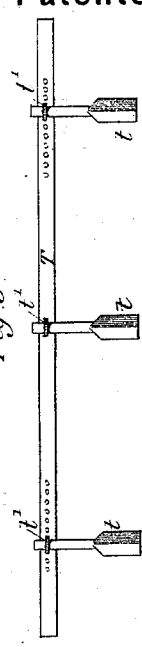
Figure 10:
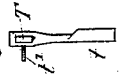
Figure 5:
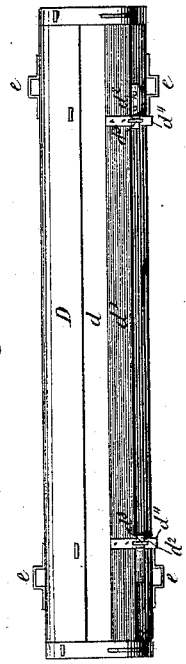
Figure 7:
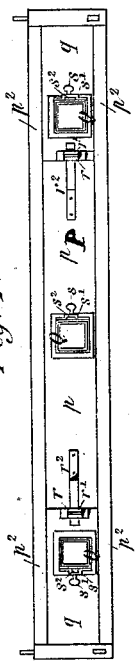
Figure 8:
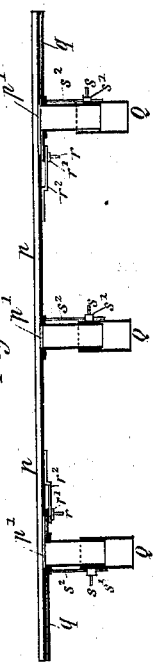

In Fig. 9 is shown, in front elevation, and in Fig. 10, in end elevation, an appliance to be attached to the front of the machine for clearing out the drills for the manure or seed. The said appliance consists of a bar, T, which carries clearer $t$, capable of adjustment to different distances apart and of being fixed in position by screws $t'$. When this appliance is to be used it is adjusted to the requisite height or degree of penetration in the guide-brackets U, (see Figs. 2, 3, and 4,) bolted to the front of the machine, and is fixed by screws $u$. (See Fig. 4, where the clearers are shown attached to the machine.)

Although this machine has been described as applied to the sowing or distributing of manure, it will be understood that it is capable of use for sowing seed or grain.

By this invention the manure or seed is prevented from adhering or caking, and so choking the distributing-aperture.

Having now described and particularly ascertained the nature of our said invention and the system, mode, or manner in or under which the same is or may be used or practically carried into effect, we would observe, in conclusion, that we wish it to be understood that we do not limit ourselves to the precise details hereinbefore described and illustrated, as the same may be varied without departing from the nature of our invention; but

What we consider to be novel and original, and therefore claim as the invention secured to us by the hereinbefore in-part-recited Letters Patent, is—

1. The body A, adjustable bottom-cover D, wind-guard M, reticulated vibrating tray I, hinged and vibrating flaps G G', stirrer-shafts H H$^1$ H$^2$, having suitable stirrers $h$, shutters F N $d^1$, and revolving brush J, substantially as and for the purpose set forth.

2. The improvements in manure and seed sowing or distributing machines hereinbefore described, by which the manure or seed is fed from a hopper onto a revolving brush, by which it is brushed through a slot in a bottom-cover and distributed over the land.

3. The adjustable trough-like bottom-cover, constructed and combined with the machine, so as to be capable of vertical adjustment to compensate for the wearing of the brush.

In testimony whereof we have signed our names to this specification in the presence of two subscribing witnesses.

WILLIAM SHAW. [L. S.]
DAVID WILLIAMSON. [L. S.]

Witnesses:
   ROBERT ADAM GUNN,
      115 *St. Vincent Street, Glasgow.*
   JAMES YATE JOHNSON,
      115 *St. Vincent Street, Glasgow.*